United States Patent [19]
Weist, Jr.

[11] Patent Number: 5,846,298
[45] Date of Patent: Dec. 8, 1998

[54] OZONE RECOVERY BY ZEOLITE ADSORBENTS

[75] Inventor: Edward Landis Weist, Jr., Macungie, Pa.

[73] Assignee: Air Products and Chemicals, Inc., Allentown, Pa.

[21] Appl. No.: 853,965

[22] Filed: May 9, 1997

[51] Int. Cl.⁶ .................................................. B01D 53/047
[52] U.S. Cl. ............................. 95/138; 95/98; 95/102; 95/105; 95/902; 96/108
[58] Field of Search ..................... 95/95–106, 138, 95/902; 96/108

[56] References Cited

U.S. PATENT DOCUMENTS

| | | | |
|---|---|---|---|
| 4,259,299 | 3/1981 | Hagiwara et al. | 95/138 X |
| 4,775,396 | 10/1988 | Rastelli et al. | 95/902 X |
| 4,778,946 | 10/1988 | Hulme et al. | 585/828 |
| 4,786,489 | 11/1988 | Grenier et al. | 95/138 X |
| 5,039,314 | 8/1991 | Lehner et al. | 95/138 X |
| 5,417,742 | 5/1995 | Tamhankar et al. | 95/902 X |
| 5,417,950 | 5/1995 | Sheu et al. | 95/902 X |
| 5,507,957 | 4/1996 | Garrett et al. | 95/138 X |
| 5,616,170 | 4/1997 | Ojo et al. | 95/902 X |
| 5,620,502 | 4/1997 | Dunne et al. | 95/902 X |

FOREIGN PATENT DOCUMENTS

| | | |
|---|---|---|
| 93301794 | 10/1993 | European Pat. Off. . |
| 0645185 | 3/1995 | European Pat. Off. . |
| 0767002 | 9/1997 | European Pat. Off. . |
| 5321850 | 3/1974 | Japan . |
| 5241192 | 9/1975 | Japan . |
| 61-271095 | 11/1986 | Japan . |
| 1-149505 | 6/1989 | Japan . |
| H4224102 | 12/1990 | Japan . |
| 3-016638 | 1/1991 | Japan ........................................ 95/138 |
| 0976644 | 11/1964 | United Kingdom . |
| 1102518 | 2/1968 | United Kingdom . |

OTHER PUBLICATIONS

W. L. Johnson et al., "Oxygen/Ozone Supply and Integration Economics", 79ᵗʰ Annual Meeting,, Technical Section, CPPA, pp. B117–B125 (not dated).

*Primary Examiner*—Robert Spitzer
*Attorney, Agent, or Firm*—John M. Fernbacher

[57] ABSTRACT

Ozone is recovered from an ozone-oxygen mixture by adsorption using an adsorbent which comprises a zeolite selected from the group consisting of L type zeolite, Y type zeolite, ZSM-5, and mordenite in which at least 90% of the exchangeable cation content is in the ammonium form and the molar ratio of potassium to aluminum is less than about 0.25. Alternatively, a proton-exchanged L type zeolite can be used in which at least 90% of the exchangeable cation content is in the proton form and the molar ratio of potassium to aluminum is less than about 0.25.

12 Claims, 4 Drawing Sheets

FIG. I

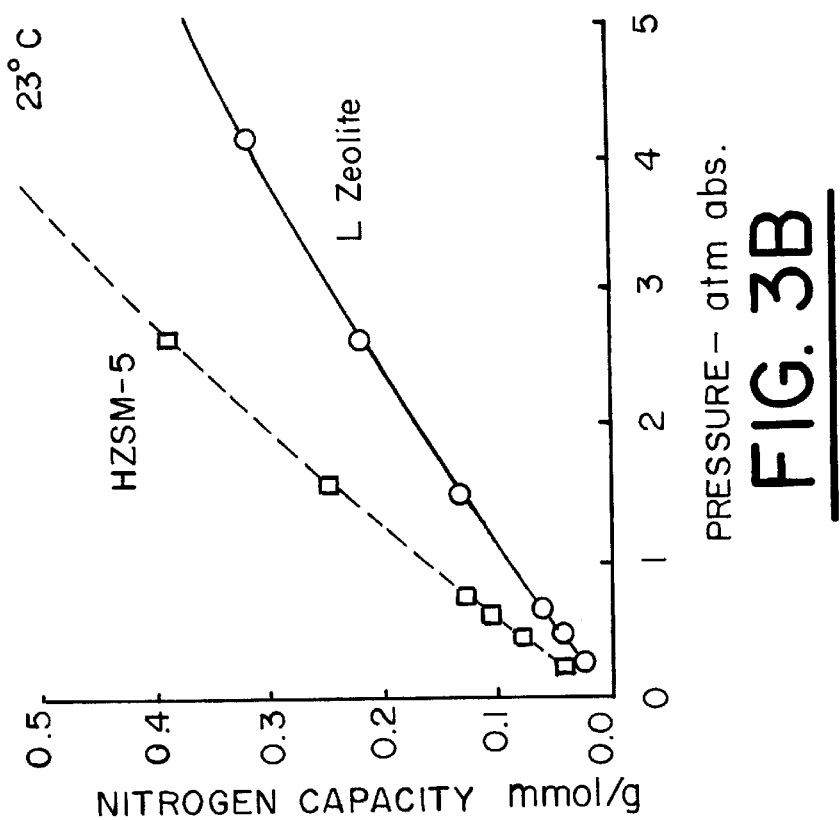
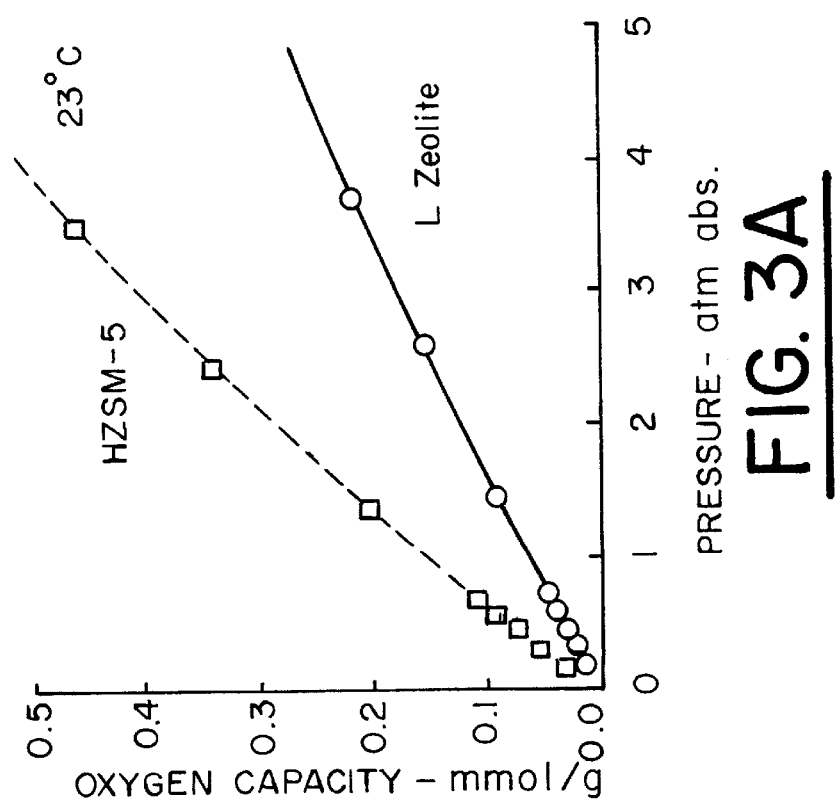

OZONE RECOVERY BY ZEOLITE ADSORBENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Ozone is generated by passing an oxygen-containing gas through a corona discharge to produce a dilute mixture of ozone and oxygen-containing gas. It is desirable to concentrate ozone for subsequent use, and this can be accomplished by adsorbing ozone from the mixture on an adsorbent and recovering concentrated ozone upon desorption. Silica gel is a commonly used adsorbent for ozone recovery, but has a low adsorptive capacity for ozone at ambient temperatures which requires adsorber operation at lower temperatures approaching the cryogenic range. Producing the refrigeration necessary for operating at these low temperatures is expensive. In addition, silica gel catalyzes the decomposition of ozone such that adsorbed ozone rapidly decomposes to form oxygen, which reduces overall ozone recovery and increases the cost of ozone generation. Zeolite adsorbents also have been used for ozone adsorption, and some zeolites exhibit problems similar to those described above for silica gel.

European Patent Application No. 93301794.9 describes a multilayered adsorption bed process for simultaneously producing an oxygen-rich product from air and recovering ozone generated from that oxygen-rich product. Silica gel is disclosed as an adsorbent for removing ozone from the ozone/oxygen mixture, and carbon molecular sieves are described for the recovery of oxygen from air. Alternative adsorbents can be utilized for ozone recovery by adsorption. Japanese Patent Application No. 1-149505 discloses H-ZSM-5 zeolite as an ozone adsorbent which contains sodium and lanthanum oxides, and teaches that the presence of lanthanum is important for the adsorptive capacity of the material. An ozone decomposition loss of up to 13% is reported during adsorption at −40° C. An Article entitled "Oxygen/Ozone Supply and Integration Economics" by W. L. Johnson et al describes the use of a pressure swing adsorption system containing a zeolite adsorbent for recovering ozone from ozone generator discharge gas. Japanese Patent Application No. H4-224102 describes the use of type 13X zeolite for adsorbing and storing ozone.

Japanese Patent Application Nos. 52 41192 and 53 21850 describe the adsorption and storage of ozone using silica gel or zeolite adsorbents containing optimum amounts of water which reduce the degree of ozone decomposition by the adsorbents. Japanese Patent Application No. 61-271095 describes the production of nitrogen-ozone mixtures wherein ozone is recovered from generator discharge gas by cyclic adsorption on silica gel or zeolite adsorbents.

Improved methods for the recovery of ozone by adsorption are desirable in view of the growing use of ozone in potable water treatment, wastewater disposal, and industrial applications. Increased efficiency in adsorption processes for ozone recovery can be realized by using selected adsorbents which are particularly well-suited for the separation of ozone-oxygen mixtures. The use of adsorbents which address these needs is disclosed in the following specification and defined in the claims which follow.

BRIEF SUMMARY OF THE INVENTION

The invention is a method for recovering ozone from an ozone-containing gas mixture which comprises contacting the gas mixture with an ozone-selective adsorbent whereby the ozone is selectively adsorbed from the gas mixture, and recovering the ozone by desorption from the adsorbent to yield an ozone-enriched gas product. The adsorbent comprises a zeolite selected from the group consisting of L type zeolite, Y type zeolite, ZSM-5, and mordenite in which at least 90% of the exchangeable cation content is in the ammonium form and the molar ratio of potassium to aluminum is less than about 0.25. Alternatively, the adsorbent comprises an L type zeolite in which at least 90% of the exchangeable cation content is in the proton form and the molar ratio of potassium to aluminum is less than about 0.25. Preferably the total non-framework metal content expressed as metal oxide is less than about 5.0 mole % and the water content is between about 0.5 and 3.0 wt %.

The invention includes an adsorbent for the recovery of ozone from an ozone-containing gas mixture which comprises a zeolite selected from the group consisting of L type zeolite, Y type zeolite, ZSM-5, and mordenite in which at least 90% of the exchangeable cation content is in the ammonium form and the molar ratio of potassium to aluminum is less than about 0.25. Alternatively the adsorbent is an L type zeolite in which at least 90% of the exchangeable cation content is in the proton form and the molar ratio of potassium to aluminum is less than about 0.25. Preferably the total non-framework metal content of these adsorbents expressed as metal oxide is less than about 5.0 mole % and the water content is between about 0.5 and 3.0 wt %.

BRIEF DESCRIPTION OF THE SEVERAL VIEWS OF THE DRAWINGS

FIGS. 3A and 3B are adsorption isotherms for oxygen and nitrogen respectively for H-ZSM-5 and the ammonium-exchanged L type zeolite of the present invention.

DETAILED DESCRIPTION OF THE INVENTION

Figure 1:
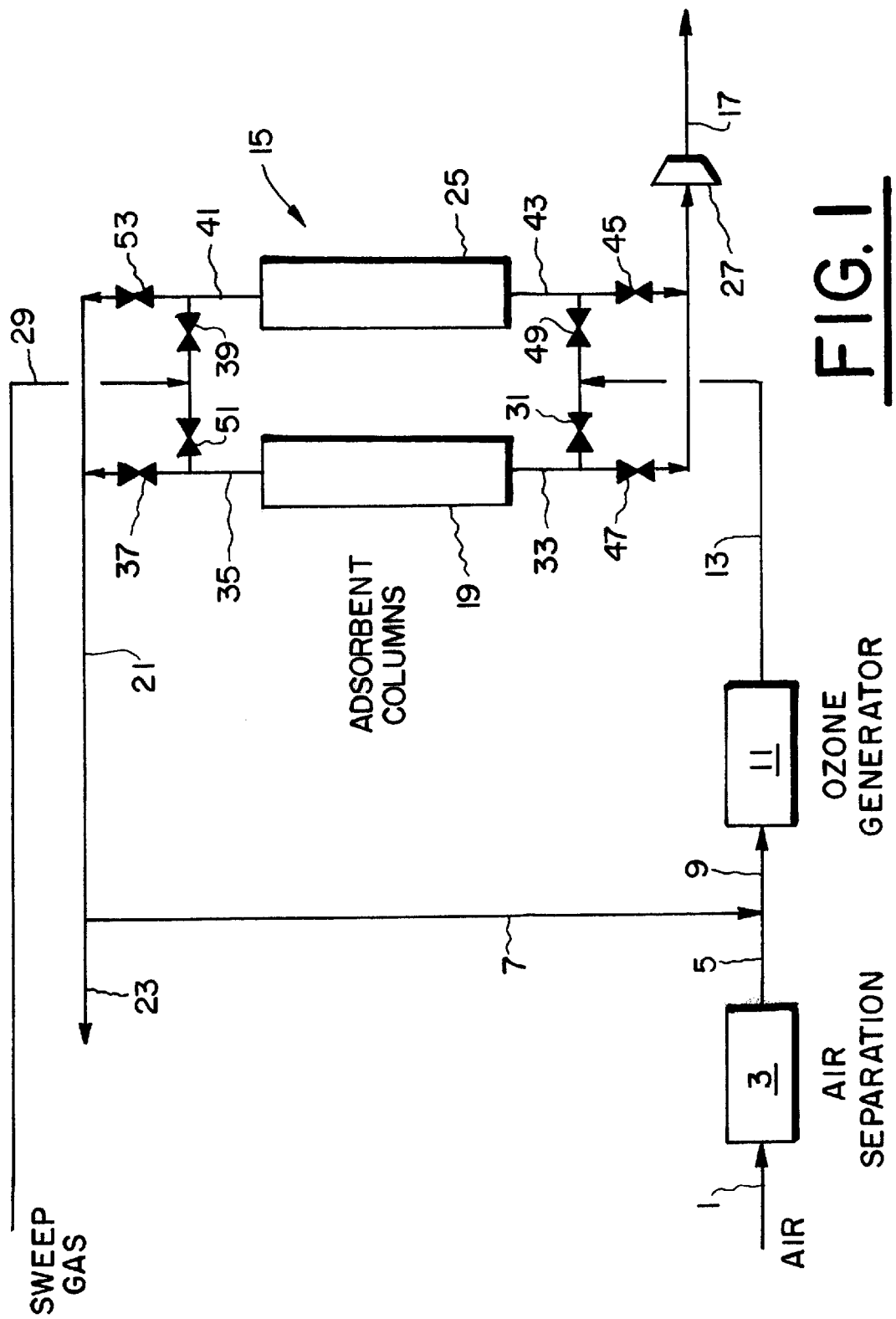
FIG. 1 is a schematic flow diagram of an ozone generation system which utilizes a pressure swing adsorption system for concentrating ozone from an ozone generator.

Ozone is produced commercially by passing an oxygen-containing gas mixture through an electrical corona discharge which converts a small portion of the oxygen into ozone. The power consumed per unit mass of ozone produced is highly dependent on the concentration of ozone leaving the generator, and a doubling of the exit ozone concentration can increase the specific power consumption by a factor of two to three. Ozone generation is much more efficient with a feed gas mixture containing 90 vol % or more oxygen compared with the use of air. As a result, many commercial ozone installations utilize an air separation system to provide high oxygen content feed to the ozone generator.

Separation of ozone from the oxygen-ozone mixture exiting the generator by pressure swing adsorption (PSA) or vacuum swing adsorption (VSA) is known in the art and provides two operating advantages. First, when using a high oxygen concentration gas to feed the ozone generator, recovering the unconverted oxygen for recycle to the ozone generator provides a substantial saving in the cost of supplying the oxygen feed. Second, a separation process following the generator allows the generation of ozone at a lower concentration, which is more power efficient. The lower ozone concentration in the generator discharge gas is subsequently increased in the separation process before final use. Both of these advantages reduce the cost of the ozone product.

Improved ozone generation is realized by utilizing the adsorbent of the present invention in a PSA process in conjunction with an ozone generator operating on a high oxygen content feed, wherein adsorbed ozone is recovered for use and the non-adsorbed oxygen is recycled to the ozone generator. The preferred adsorbent of the present invention is an ammonium-exchanged zeolite selected from an L type zeolite, a Y type zeolite, ZSM-5, and mordenite in which at least 90% of the exchangeable cation content is in the ammonium form and the molar ratio of potassium to aluminum is less than about 0.25. Alternatively the adsorbent is a proton-exchanged L type zeolite in which at least 90% of the exchangeable cation content is in the proton form and the molar ratio of potassium to aluminum is less than about 0.25.

Preferably the total non-framework metal content of these adsorbents expressed as metal oxide is less than about 5.0 mole % and the water content is between about 0.5 and 3.0 wt %. Non-framework metal content includes metals in the form of cations, elemental metals, and metal-containing compounds present as exchanged cations which balance the charge on the active anionic aluminosilicate framework, and includes any metals present in the adsorbent binder material. Metals are defined to include those in groups 1–12 of the revised IUPAC Periodic Table (see Pure & Applied Chemistry, Vol. 60, No. 3, 1988, pp. 431–436).

The ammonium form of the L type zeolite adsorbent, $NH_4$-K-L, is readily prepared from commercially-available K-L zeolite, which typically has a K/Al ratio of about 1.0, by contacting a sample of the available zeolite with a solution of ammonium nitrate at between room temperature and reflux conditions until equilibrium is reached. This step is repeated with fresh ammonium nitrate solution until the desired molar ratio of less than about 0.25 is achieved. K-L zeolite can be obtained from manufacturers including Tosoh, UOP, and PQ Corporation. The exchanged proton form of the L type zeolite, H-K-L, is prepared by contacting K-L or $NH_4$-K-L zeolite with dilute nitric acid solution at between room temperature and reflux until equilibrium is reached. This step is repeated until the desired proton level is reached. Pellets of the adsorbent should be either binderless (formed without a binder) or formed with a binder such as silica which does not promote ozone decomposition.

The preferred zeolites described above can be used in any type of adsorption system for recovering ozone from ozone-oxygen mixtures. A pressure swing adsorption (PSA) system typically is integrated with an ozone generator in which the PSA system concentrates the ozone from the ozone generator for later use and recovers oxygen for recycle to the ozone generator. One such integration is illustrated in FIG. 1. Air 1 is separated in air separation system 3 to produce oxygen product 5 typically containing greater than 85 vol % oxygen. Air separation system 3 can be a cryogenic, adsorptive, or any other known type of separation system known in the art.

Alternatively, oxygen 5 can be provided by vaporizing liquid oxygen by known methods. Oxygen 5 optionally is combined with oxygen-containing recycle stream 7 (later defined) and combined feed 9 is introduced into ozone generator 11 Ozone is produced from oxygen in generator 11 by known methods to produce ozone-containing generator discharge 13 typically having an ozone concentration of 2 to 12 mol %. The ozone in ozone generator discharge 13 is concentrated in pressure swing adsorption system 15 which comprises a plurality of vessels or adsorption columns containing one of the preferred adsorbents earlier described. In the particular system shown in FIG. 1, the adsorption system contains two adsorbent columns which operate in a cyclic mode to produce ozone-enriched product gas 17 containing 2 to 25 mol % ozone.

Ozone generator discharge gas 13 typically at ambient temperature and a pressure between 1 and 3 atma is introduced into adsorption column 19 containing a preferred ozone-selective adsorbent as earlier described. Ozone-depleted, oxygen-enriched adsorption column effluent 21 is withdrawn containing typically 85 to 100 vol % oxygen, which is recycled as stream 7 and combined with oxygen 5 as earlier described. Recycling the oxygen in this manner greatly increases oxygen utilization and minimizes the oxygen requirements for ozone generation. Purge stream 23 can be withdrawn if necessary to prevent the buildup of undesirable components in the ozone generator/PSA system recycle loop.

Simultaneously during the operation of adsorption column 19, adsorption column 25, which previously operated in the adsorption mode and contains adsorbed ozone, is regenerated in a flow direction countercurrent to that of the adsorption step by depressurization and evacuation through vacuum blower 27. Sweep gas 29 optionally is introduced during at least a portion of the evacuation step to promote ozone desorption and withdrawal. Sweep gas 29 is any acceptable gas which promotes ozone desorption and sweeps the void space in the adsorption column. The sweep gas should be compatible with the downstream ozone-consuming process, and can be selected from ozone generator fresh feed (i.e. stream 5 of FIG. 1), reject gas from air separation system 3, dried compressed air feed 1 to air separation system 3, or an externally-supplied gas. Ozone-enriched product gas 17 containing 2 to 25 vol % ozone is withdrawn for use in a subsequent ozone-consuming process (not shown).

Gas flow during the simultaneous adsorption and regeneration steps described above is controlled by the valve manifolds of FIG. 1 in which ozone generator discharge gas 13 flows through valve 31 and line 33 into adsorption column 19, and ozone-depleted gas is withdrawn therefrom through line 35 and valve 37. Sweep gas 29 is introduced through valve 39 and line 41 into adsorption column 25, and ozone-enriched gas is withdrawn through line 43 and valve 45 to vacuum blower 27. During these simultaneous steps valves 47, 49, 51, and 53 are closed. When the regeneration of adsorption column 25 is complete, sweep and evacuation are terminated by closing valves 45 and 53, and the column is repressurized to the adsorption pressure by admitting a portion of ozone generator discharge gas 13 through valve 49.

The adsorption step of adsorption column 19 is terminated when the ozone concentration in ozone-depleted gas 21 rises to a predetermined level or after a predetermined time period. The respective adsorption and repressurization steps of columns 19 and 25 are timed such that they end simultaneously.

After completion of the cycle described above, adsorption columns 19 and 25 are switched such that ozone generator discharge gas 13 is introduced into column 25 to initiate an adsorption step, while simultaneously the regeneration of column 19 proceeds as described above for column 25. This switch is accomplished by opening valves 49, 53, 51, and 47 and closing valves 31, 37, 39, and 45. The simultaneous adsorption and regeneration steps proceed as described above. When the steps are complete, the columns are switched between adsorption and regeneration in a continuous series of alternating cycles. Further descriptions of two-column cycles are given in the Examples below.

The adsorption step described above can be carried out in a temperature range of −40° to +40° C. and preferably is carried out in the range of −10° to +30° C. The regeneration step is effected preferably in the range of −10° to +30° C.

The benefit of using $NH_4$-K-L or H-K-L zeolites is not limited to the PSA system and cycle described above with reference to FIG. 1. Other PSA cycles known in the art for ozone concentration will benefit from the lower oxygen and nitrogen capacity of the preferred zeolite adsorbents. Such alternative PSA cycles may utilize variations on the steps described above and may utilize more than two adsorption columns. Other known steps include column rinse or purge with product gas, dual end evacuation, column-to-column pressure equalization, column-to-column purge, use of an external purge gas, and feed repressurization. The selection of a specific adsorption cycle for ozone recovery and oxygen recycle to the ozone generator in a given application will depend on specific engineering and economic considerations for that application. For example, in certain situations it may be desirable to maximize oxygen recovery without significantly increasing the ozone concentration in the final ozone product.

$NH_4$-K-L or H-K-L zeolites in particular have an advantage in ozone adsorption over the H-ZSM-5 zeolites disclosed in the prior art for ozone adsorption, for example in Japanese Patent Application No. 1-149505 cited above. The L-type adsorbents of the present invention, as illustrated by $NH_4$-K-L, have lower adsorption capacities for oxygen and nitrogen than does H-ZSM-5 zeolite. This is an advantage when the adsorbent is used in PSA systems such as that described above with reference to FIG. 1, which is realized in the withdrawal of gas as ozone-enriched product 17 during the sweep and evacuation steps described earlier. When an $NH_4$-K-L or H-K-L zeolite is used instead of an H-ZSM-5 zeolite, the gas withdrawn during sweep and evacuation contains less desorbed oxygen and nitrogen which was coadsorbed with ozone during the adsorption step. The total volume of gas processed by vacuum blower 27 during the evacuation step is therefore lower for the same ozone recovery, which results in a lower power requirement for the blower. In addition, ozone-enriched product 17 contains a higher concentration of ozone. Further, the loss of oxygen in ozone-enriched product 17 is reduced and more oxygen is recycled to the ozone generator in stream 21, thereby improving oxygen utilization.

The water content of a zeolite adsorbent used for recovering or concentrating ozone should be maintained in an optimum or preferred range to maximize the effective working ozone adsorption capacity. Water content is defined as the weight loss of an adsorbent sample during heating from room temperature to 400° C. as determined by thermogravimetric analysis. The preferred range of water content may be different for different zeolites. If the water content of the adsorbent is too high or too low, the effective ozone adsorption capacity will be reduced because of the effects of water on ozone physical adsorption capacity and ozone decomposition rates. The net effective ozone adsorption capacity is determined by these two mechanisms in combination and is not readily predictable for individual zeolites.

For the L type zeolites preferred in the present invention, the effect of water content on effective ozone capacity was determined as described in the Examples below, and the preferred range is between about 0.5 and 3.0 wt % water. The preferred range of water content for other ammonium-exchanged or proton-exchanged zeolites used for ozone adsorption in the present invention will depend on the particular zeolite structure, and this preferred range can be determined readily by measuring the effective ozone capacity over a range of adsorbent water contents.

The present invention also includes the use of other zeolites such as mordenite, ZSM-5, and Y-type zeolite which are exchanged with ammonium ions to yield a K/Al ratio below about 0.25 as described above. It is expected that Y-type zeolite will have oxygen, ozone, and nitrogen adsorption capacities similar to those of L-type zeolite.

EXAMPLE 1

A sample of $NH_4$-K-L zeolite was prepared from 30 grams of a silica-bound H-K-L zeolite was obtained from Tosoh USA. The H-K-L zeolite was mixed with 300 cc of 1.0M aqueous ammonium nitrate solution, the mixture was heated to 90° C. over a 30 minute period, and then the heated mixture was held at 90° C. for at least four hours. Equilibrium exchange between potassium and ammonium ions occurred after about two hours. The mixture was cooled, decanted, and rinsed three times with 500 cc of deionized water. The entire procedure was repeated twice. After the third exchange procedure, the solid exchanged material was dried at 125° C. for 16 hours. The K/Al ratio of the dried exchanged material was determined to be 0.21 by atomic absorption analysis.

EXAMPLE 2

The ozone, oxygen, and nitrogen adsorption capacities of a $NH_4$-K-L zeolite of Example 1 and of a commercially-available H-ZSM-5 were measured and compared. The water contents of the $NH_4$-K-L and H-ZSM-5 zeolites were 3.0 and 2.2 wt % respectively. Each ozone capacity was determined isothermally as a function of ozone partial pressure by a dynamic method in which an ozone-oxygen mixture having a constant oxygen partial pressure of 1.82 atm was passed through a stainless steel adsorber tube ½ inch O.D. by 10 inches long containing 15 grams of adsorbent. The ozone-oxygen mixture was generated by passing a stream of oxygen at between 0.5 and 1.0 standard liters per minute through a Sorbios GSF 0.2 ozone generator. The power level of the generator was manually adjusted to obtain the desired ozone concentration at the exit as measured by a BMT 961 ozone analyzer. The total pressure of the gas in the adsorber was controlled by a solenoid-actuated needle valve to provide the oxygen partial pressure of 1.82 atm. The concentration of ozone at the adsorber outlet was measured by another BMT 961 ozone analyzer. When the ozone concentrations at the adsorber inlet and outlet were equal, the adsorber was isolated and the downstream instruments and piping were purged with nitrogen at 0.5 standard liters per minute. After purging of the downstream instruments, the adsorber was purged with the same flow rate of nitrogen at the same total adsorption pressure and the purge gas was passed through the ozone analyzer, an Illinois oxygen analyzer, and an MKS mass flow meter until the adsorber was completely purged of oxygen and ozone. The analyzer outputs were integrated to calculate the actual amounts of ozone and oxygen desorbed, and the adsorbent capacities were calculated.

Figure 2:
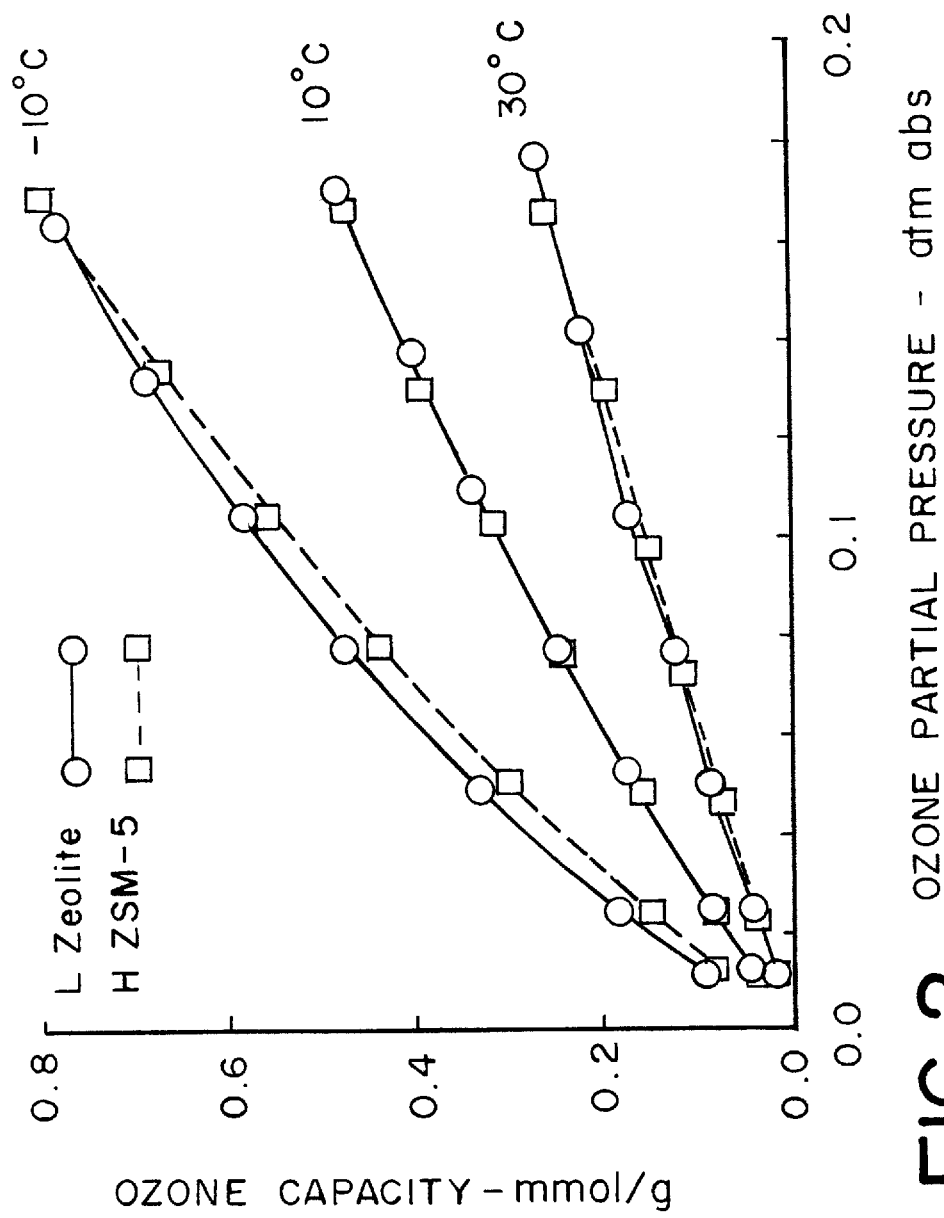
FIG. 2 is a plot of ozone capacity vs ozone partial pressure for the adsorption of ozone from ozone-oxygen mixtures using H-ZSM-5 and the ammonium-exchanged L type zeolite of the present invention.

The ozone capacities were determined by this method at $-10°$ C., $10°$ C., and $30°$ C. over a range of ozone partial pressures and are reported in FIG. 2. Oxygen and nitrogen adsorption isotherms for H-ZSM-5 and $NH_4$-K-L were measured at $23°$ C. with pure gas using standard volumetric methods. The resulting isotherms are given in FIGS. 3 and 4.

Figure 4:
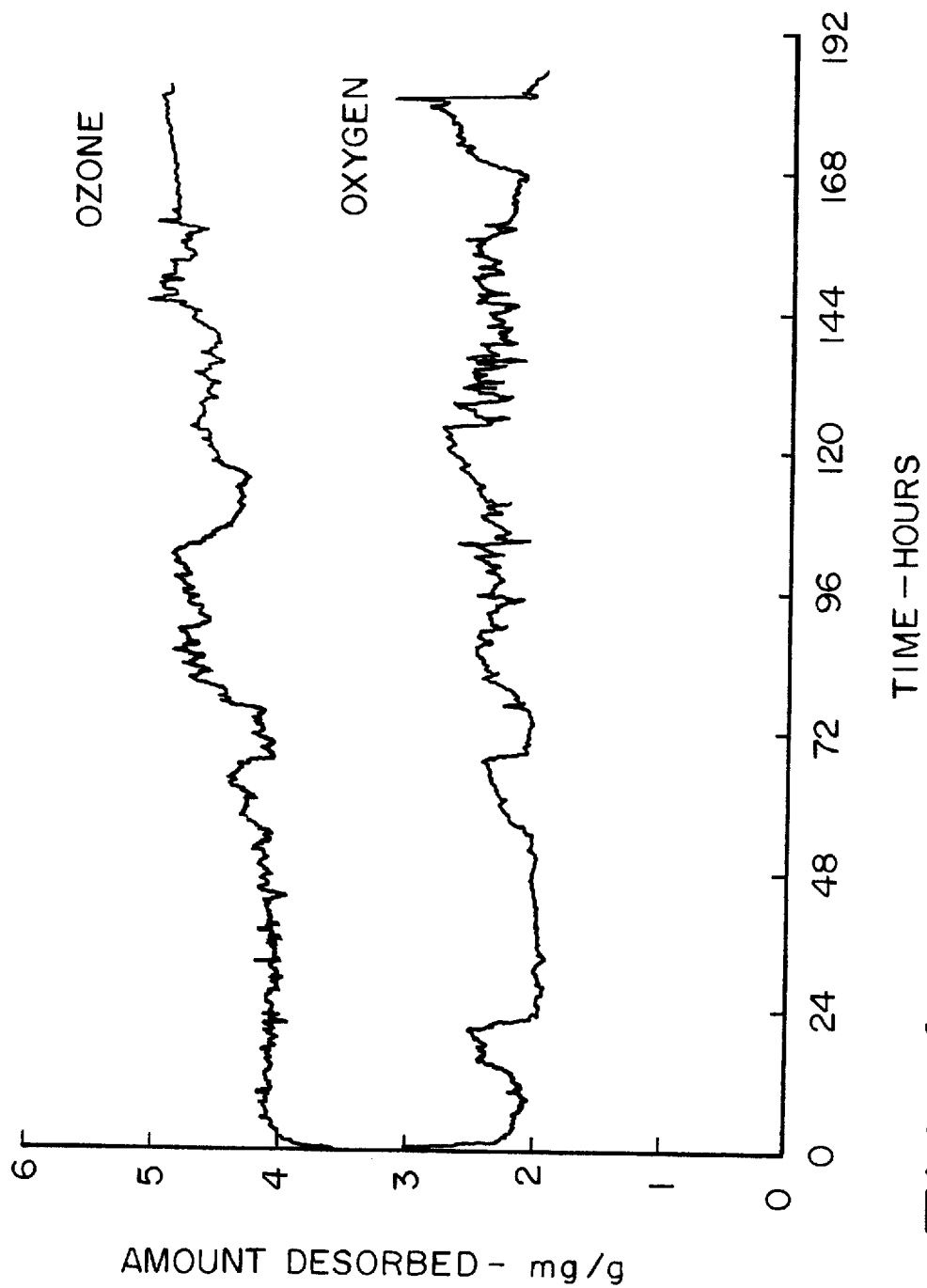
FIG. 4 is a plot of ozone desorption vs time for continuous adsorption-desorption cycles with an ozone-oxygen mixture using H-ZSM-5 and the ammonium-exchanged L type zeolite of the present invention.

It is seen from FIG. 2 that the H-ZSM-5 and $NH_4$-K-L adsorbents have comparable ozone adsorption capacities. FIGS. 3 and 4 show that $NH_4$-K-L has lower oxygen and nitrogen capacities than H-ZSM-5, which is an advantage in PSA cycles as described earlier and as illustrated below.

EXAMPLE 3

The adsorption capacities of the $NH_4$-K-L adsorbent as prepared in Example 1 were determined for oxygen and ozone under mixed gas flow conditions. An ozone-oxygen feed mixture containing 8 wt % ozone was passed through a 15 gram bed of the $NH_4$-K-L adsorbent at $30°$ C. and a total pressure of 1.1 atma for 10 minutes to reach adsorption equilibrium. The feed was discontinued and the adsorbed ozone and oxygen were desorbed into a cocurrent purge stream of nitrogen while the effluent purge gas composition was measured during desorption. The total amounts of desorbed ozone and oxygen were calculated by material balance and the adsorbent capacities were determined. This cycle was repeated over a period of 180 hours, and the ozone and oxygen capacities determined in this cyclic manner are plotted in FIG. 5. The dynamic ozone adsorbent capacity measured under these conditions is about twice that of oxygen, and the capacities do not appear to decrease with time for the period of the experiment.

EXAMPLE 4

Ozone was recovered from an ozone-oxygen mixture in a two-column adsorption pilot unit in which each column contained 2.6 kg of silica-bound H-ZSM-5 zeolite adsorbent. The columns were 5.5 cm inside diameter and 157 cm long, and the average bed temperature for each cycle was $19°$ C. The feed contained 5.9 wt % ozone in oxygen and was supplied during the adsorption step at a feed rate of 1.5 kg/hr.

The columns were operated cyclically according to the adsorption cycle summarized below:

| Time Period, sec. | Column 1 | Column 2 |
| --- | --- | --- |
| 0–45 | Adsorption | Evacuation |
| 45–210 | Adsorption | Sweep |
| 210–240 | Adsorption | Repressurization |
| 240–285 | Evacuation | Adsorption |
| 285–450 | Sweep | Adsorption |
| 450–480 | Repressurization | Adsorption |

Each step is described below:

Adsorption step: 1.5 kg/hr feed at pressure of 2 bara

Evacuation step: evacuate to 0.9 bara

Sweep step: 0.34 kg/hr nitrogen sweep during evacuation to a final pressure of 0.5 bara Repressurization step: 3.5 kg/hr nitrogen introduced up to a pressure of 2 bara The resulting product gas contained 10.0 wt % ozone, which was the average concentration of the total evacuation and sweep step gas effluents.

EXAMPLE 5

H-ZSM-5 and $NH_4$-K-L zeolites were compared for concentrating ozone in an ozone generator discharge gas using a dynamic adsorption simulation program developed to simulate a pressure swing adsorption process. The adsorption data of Example 2 were used and a linear driving force model was utilized to predict the mass transfer coefficients, which were assumed to be the same for both the H-ZSM-5 and $NH_4$-K-L zeolites.

The ozone adsorption system is integrated with an oxygen supply and ozone generator system as described earlier with respect of FIG. 1. Oxygen-rich feed gas 5 contains 93 vol % oxygen, 4.25 vol % argon, and 2.75 vol % nitrogen, and a gas of the same composition is used as the sweep gas during the regeneration step.

The ozone generator discharge gas 13 to the simulated adsorption system of FIG. I contains 6 wt % ozone in oxygen at a flow rate of 200 kg/hr at 1.5 atma pressure and the concentrated product gas 17 contains 13 wt % ozone. The simulated adsorption system comprises two adsorption columns operating cyclically according to the adsorption cycle summarized below where x is 10 seconds for the $NH_4$-K-L zeolite and 18 seconds for the H-ZSM-5 zeolite. Each of the two adsorption columns 19 and 25 contains 4 tons of adsorbent.

| Time Period, sec. | Column 1 | Column 2 |
| --- | --- | --- |
| 0 to x | Repressurization | Evacuation |
| x to 90 | Adsorption | Sweep |
| 90 to 90 + x | Evacuation | Repressurization |
| 90 + x to 180 | Sweep | Adsorption |

Each step in the cycle is described below:

Adsorption step: pass the ozone generator discharge gas 13 at a pressure of 1.5 atma into adsorption column 19 while withdrawing oxygen-enriched stream 21 for recycle 7 to the ozone generator.

Evacuation step: evacuate countercurrent to the feed direction to a final pressure of 0.43 atma for the L-zeolite and 0.27 atma for the ZSM-5 zeolite.

Sweep step: pass oxygen sweep gas (obtained as a portion of oxygen feed gas 5) through column 19 countercurrent to the feed direction while continuing evacuation, and withdraw ozone-enriched product gas 17. The sweep gas was provided at 470 std $ft^3$ per minute at 0.36 atma for the L-type zeolite and 380 std $ft^3$ per minute at 0.21 atma for the ZSM-5 zeolite. The average concentration of the evacuation and sweep gas streams was 13 wt % ozone.

Feed repressurization step: introduce the ozone generator discharge gas 13 into column 19 in the feed direction to repressurize the column to the operating pressure of 1.5 atma.

The evacuation requirement during the evacuation step is 1500 actual cubic feet per minute (acfm) for the $NH_4$-K-L zeolite and 2100 acfm for the H-ZSM-5 zeolite. This difference is a direct result of the lower oxygen adsorption capacity of the $NH_4$-K-L zeolite, and yields both capital and power savings because a smaller vacuum blower is required. In addition, less oxygen is lost in the ozone product which means that more oxygen is available for recycle to the ozone generator.

EXAMPLE 6

The effects of water on the adsorption capacities and ozone decomposition rate of $NH_4$-K-L zeolite were determined at 20° C. Water contents of the adsorbents were determined by TGA weight loss at 300° C., and the ozone and oxygen capacities were determined using the method of Example 2. The ozone decomposition rates were determined by saturating the adsorber with an ozone-oxygen mixture as in Example 2, and then isolating the adsorbent bed. The total pressure was monitored for periods of 1–5 days, and the amount of ozone remaining after each period was determined by purging with nitrogen and analyzing the purge effluent as described in Example 2. Ozone decomposition was found to follow first order reaction kinetics. The results of the ozone decomposition measurements are summarized below.

| Water Content, wt % | Ozone Capacity at 0.08 atma and 20° C., mg/g | Oxygen Capacity at 0.92 atma and 20° C., mg/g | 1st Order Ozone decomposition rate, 1/sec |
|---|---|---|---|
| 1.5 | 12.2 | 2.7 | $3.9 \times 10^{-5}$ |
| 3.0 | 8.9 | 1.8 | $2.9 \times 10^{-5}$ |
| 4.5 | 5.9 | 0.6 | $3.0 \times 10^{-5}$ |
| 9.0 | 0.1 | 0.2 | $3.9 \times 10^{-5}$ |

These results indicate that the preferred water content is between about 0.5 and 3.0 wt %. This estimate of the preferred lower level of water content is based on the general observation that dry adsorbents have essentially zero effective ozone capacity because of the high ozone decomposition rate on dry adsorbents.

Thus the use of the preferred adsorbents of the present invention improve the performance of PSA systems for concentrating ozone from ozone generators prior to use in ozone-consuming processes. The generally lower adsorption capacities of these preferred adsorbents for oxygen and nitrogen, when compared with prior art adsorbents such as H-ZSM-5 zeolites, reduce evacuation requirements during regeneration, reduce oxygen loss in the ozone-enriched product gas, and increase the amount of oxygen available for recycle to the ozone generator.

The essential characteristics of the present invention are described completely in the foregoing disclosure. One skilled in the art can understand the invention and make various modifications without departing from the basic spirit of the invention, and without deviating from the scope and equivalents of the claims which follow.

I claim:

1. A method for recovering ozone from an ozone-containing gas mixture which comprises contacting the gas mixture with an ozone-selective adsorbent whereby the ozone is selectively adsorbed from the gas mixture, and recovering the ozone by desorption from the adsorbent to yield an ozone-enriched gas product, wherein the adsorbent comprises a zeolite in which at least 90% of the exchangeable cation content is in the ammonium form and the molar ratio of potassium to aluminum is less than about 0.25, and wherein the zeolite is selected from the group consisting of L type zeolite, Y type zeolite, ZSM-5, and mordenite.

2. The method of claim 1 wherein the adsorbent has a total non-framework metal content expressed as metal oxide of less than about 5.0 mole %.

3. The method of claim 1 wherein the adsorbent contains between about 0.5 and 3.0 wt % water.

4. A method for recovering ozone from an ozone-containing gas mixture which comprises contacting the gas mixture with an ozone-selective adsorbent whereby the ozone is selectively adsorbed from the gas mixture, and recovering the ozone by desorption from the adsorbent to yield an ozone-enriched gas product, wherein the adsorbent comprises an L type zeolite in which at least 90% of the exchangeable cation content is in the proton form and the molar ratio of potassium to aluminum is less than about 0.25.

5. The method of claim 4 wherein the adsorbent has a total non-framework metal content expressed as metal oxide of less than about 5.0 mole %.

6. The method of claim 4 wherein the adsorbent contains between about 0.5 and 3.0 wt % water.

7. An adsorbent for the recovery of ozone from an ozone-containing gas mixture which comprises a zeolite in which at least 90% of the exchangeable cation content is in the ammonium form and the molar ratio of potassium to aluminum is less than about 0.25 wherein the zeolite is selected from the group consisting of L type zeolite, Y type zeolite, ZSM-5, and mordenite.

8. The adsorbent of claim 7 wherein the adsorbent has a total non-framework metal content expressed as metal oxide of less than about 5.0 mole %.

9. The adsorbent of claim 7 which contains between about 0.5 and 3.0 wt % water.

10. An adsorbent for the recovery of ozone from an ozone-containing gas mixture which comprises an L type zeolite in which at least 90% of the exchangeable cation content is in the proton form and the molar ratio of potassium to aluminum is less than about 0.25.

11. The adsorbent of claim 10 wherein the adsorbent has a total non-framework metal content expressed as metal oxide of less than about 4.0 mole %.

12. The adsorbent of claim 10 which contains between about 0.5 and 3.0 wt % water.

* * * * *